United States Patent [19]

Torii et al.

[11] Patent Number: 5,278,268
[45] Date of Patent: Jan. 11, 1994

[54] ORGANIC GLASS FOR OPTICAL PARTS

[75] Inventors: Tadashi Torii, Aichi; Kazuo Makino, Gamagori, both of Japan

[73] Assignee: Itoh Optical Industrial Co. Ltd., Gamagori, Japan

[21] Appl. No.: 920,284

[22] PCT Filed: Oct. 30, 1991

[86] PCT No.: PCT/JP91/01481
§ 371 Date: Aug. 14, 1992
§ 102(e) Date: Aug. 14, 1992

[87] PCT Pub. No.: WO92/07888
PCT Pub. Date: May 14, 1992

[30] Foreign Application Priority Data

Nov. 6, 1990 [JP] Japan ................................ 2-301446

[51] Int. Cl.$^5$ ............................................. C08L 75/04
[52] U.S. Cl. .................................... 526/301; 523/106
[58] Field of Search ........................ 526/301; 523/106

[56] References Cited

FOREIGN PATENT DOCUMENTS 0209124 1/1987 European Pat. Off. .

Primary Examiner—Maurice J. Welsh
Attorney, Agent, or Firm—Armstrong, Westerman, Hattori, McLeland & Naughton

[57] ABSTRACT

The invention provides an organic glass for optical parts, in which the main polymer component is constituted by a bipolymer consisting of (a) a diallyl ester of diphenic acid, and (b) an urethane acrylate having vinyl groups introduced into both its ends by the reaction of a chainlike polyurethane having hydroxyl groups at both its ends, obtained by the reaction of a diisocyanate component with a diol component, with acrylic or methacrylic acid. This organic glass for optical parts has a high refractive index and excels in transmittance, impact resistance and other physical properties as well, so that it can be applied to optical parts to which only inorganic glass has been applied so far in the art.

2 Claims, 1 Drawing Sheet

ORGANIC GLASS FOR OPTICAL PARTS

BACKGROUND OF THE INVENTION

The present invention relates to an organic glass which has a high refractive index and excels in other optical properties and so lends itself well for materials for optical parts such as lenses and prisms.

In the following description, the organic glass for optical parts according to this invention will be explained specifically but not exclusively with reference to lenses.

In the present disclosure, it is noted that unless otherwise stated, "parts" are given by weight.

It is also understood that unless otherwise specified, the term "urethane acrylate" used hereinafter refers to an urethane acrylate which may contain as the acid component not only acrylic acid but methacrylic acid as well.

Organic glass, being lighter in weight than inorganic glass, has attracted attention as a lens material for spectacles, and an organic glass of the type made of polymers of diethylene glycol bis(allyl carbonate)—hereinafer ADC for short, methyl methacrylate, etc. has been used to this end. However, this organic glass has a refractive index of 1.49–1.50, which is lower than that of inorganic glass (e.g., that of white crown glass is 1.523), so that when it is used as a lens material for spectacles for correcting visual power, the lens becomes thicker than that made up of inorganic glass, imparing the merits of being lighter weight, and imparing appearance as well. This tendency becomes more marked as the degree of the lens becomes strong. Thus, organic glass does not always lend itself well for a material for visual power-correcting lenses.

In order to overcome this problem, for instance, a copolymer composed mainly of a diallyl ester of biphenyl dicarboxylate has been proposed (Japanese Patent Laid-Open Publication No. 63-23908), but there is still left much to be desired in terms of a refractive index, impact resistance, etc.

In general, difunctional unsaturated compounds are likely to yield hard and fragile polymers, because they form a three-dimensional, crosslinked structure by polymerization reactions. In such cases, the introduction of a certain unsaturated compound into the crosslinked structure comes to mind (see, for instance, Japanese Patent Publication No. 62-50488). In the case of a biphenyl compound, however, this alone would make it difficult to improve impact resistance, because the degree of rigidness of the crosslinked structure is much higher.

In view of such situations as mentioned above, an object of this invention is to provide an organic glass for optical parts, which does not only possess a high refractive index but also excels in various physical properties, inter alia., impact resistance as well.

SUMMARY OF THE INVENTION

In an effort to solve the above-mentioned problems, we have made intensive studies and consequently found that reducing the degree of rigidity of a polymer or, in other words, improving the impact resistance thereof, is achievable by additionally using a specific second monomer component, possibly with a specific third monomer component. Thus, we have successfully invented the following organic glass.

More specifically, this invention provides an organic glass for optical parts, which contains as a main polymer component a bipolymer of diallyl ester of diphenic acid (i.e., biphenyl-2,2'-dicarboxylic acid) and a bifunctional urethane acrylate or a terpolymer of diallyl ester of diphenic acid, a bifunctional urethane acrylate and an unsaturated alcohol ester of phenyl benzoate.

Set out below are the functions of the organic glass for optical parts according to this invention.

(1) In the diphenic acid ester that is the first component used in this invention, not only is the ester group located at the ortho-position on the biphenyl group, but the biphenyl group itself is also twisted so that there cannot be any steric hinderance. It is thus possible to achieve a polymerization degree high enough to obtain a copolymer which has a three-dimensional, crosslinked structure and the copolymer becomes infusible and insoluble. Because of containing the biphenyl group, the first component can, on the one hand, improve the heat resistance, water resistance and weather resistance of the copolymer and, on the other hand, impart low shrinkage upon polymerization, lower linear expansion coefficient and high refractive index to the copolymer.

(2) It can be presumed that the bifunctional urethane acrylate that is the second component of this invention copolymerizes with the first component, i.e., the bifunctional diallyl ester of diphenic acid to introduce a flexible urethane molecular chain into a high-order crosslinked structure formed by the first component—which is responsible for brittleness, whereby the impact resistance of the copolymer is increased without reducing its crosslinked density.

(3) The unsaturated alcohol ester of phenyl benzoate that is the optional third component of this invention contributes to improving the impact resistance and other properties of the copolymer without imparing its refractive index and extends the usable quantitative range of the diallyl ester of diphenic acid and bifunctional urethane acrylate. That is, it can be presumed that the unsaturated-alcohol-ester-of phenyl-benzoate component copolymerizes With the bifunctional diallyl ester of diphenic acid, whereby a network structure of high density obtained by the first component—which is responsible for brittleness—is allowed to increase in the number of intercrosslinked molecules or, in other words, decrease in the crosslinked density, thereby imparting a degree of freedom to the molecular chain and so contributing to improvement of the impact resistance of the copolymer. In addition, the unsaturated alcohol ester can be considered to extend the usable quantative range of the bifunctional urethane acrylate (the second component) due to its high refractive index and good copolymerizability, contributing to further improvement of the impact resistance of the copolymer.

DETAILED DESCRIPTION OF THE PREFERRED EMBODIMENTS

Figure 1:
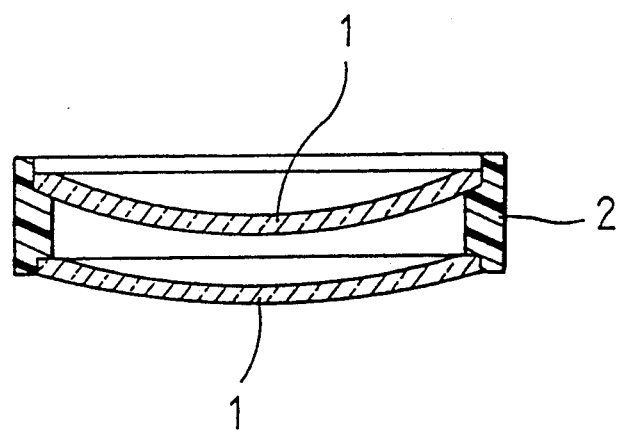
FIG. 1 is a sectional view illustrative of a molding tool used in examples of the invention.

The organic glass for optical parts according to this invention is obtained by casting a molding material in a molding tool by polymerization by adding a polymerization initiator to a mixture composed of the following monomer components (a) and (b) or (a), (b) and (c), through

Mixture Composition (1)

(a) Diallyl ester of diphenic acid: 85–95 parts, and
(b) Bifunctional urethane acrylate: 5–15 parts.

Mixture Composition (2)

(a) Dallyl ester of diphenic acid: 50–90 parts,
(b) Bifunctional urethane acrylate: 5–20 parts, and
(c) Unsaturated alcohol ester of phenyl benzoate 5–35 parts.

If component (a) is less than 85 parts or the component (b) exceeds 15 parts, then the mixture composition (1) would yield a polymer suffering from an insufficiency of surface hardness and a refractive index, and if the component (a) exceeds 95 parts or the component (b) is less than 5 parts, then it would not bring the polymer its own effect, resulting in more coloration and poor impact resistance.

If the component (a) is less than 50 parts or the component (b) exceeds 20 parts, then the mixture composition (2) would yield a polymer suffering from an insufficiency of surface hardness and a refractive index. On the contrary, if the component (a) exceeds 95 parts or the components (b) and (c) are each less than 5 parts, then they would fail to bring the polymer their own effects, resulting in more coloration and poor impact resistance. In addition, if the component (c) exceeds 35 parts, then there would be a decreasing of surface hardness and a refractive index.

The term "bifunctional urethane acrylate" used in the present disclosure is understood to mean an urethane acrylate having vinyl groups introduced into both Its ends by allowing acrylic or methacrylic acid to react with a chainlike polyurethane with hydroxyl groups at both its ends, which is obtained by the reaction of a diisocyanate component with a diol component.

Usually, the diisocyanate component used, for instance, may include tolylene diisocyanate (TDI), m-xylylene diisocyanate (XDI) and tetrametylxylylene diisocyanate (TMXDI).

The diol component used, for instance, may include a polyester polyol obtained by the reaction of a dicarboxylic acid like adipic acid with a polyol, a polyether polyol obtained by homo- or co-polymerization of a cyclic ether such as ethylene and propylene oxides, and acryl polyol.

More illustratively, use may be made of urethane acrylates of the following grades, manufactured and sold by Sin-Nakamura Kagaku Kogyo K.K. under the trade name of "NK OLIGO". Note that, of the following urethane acrylates, "U-200MX" contains methacrylic acid as the acid component and the rest contain acrylic acid as the acid component.

| Grade | Molecular Weight |
| --- | --- |
| U-200AX | 2700 |
| U-108A | 1570 |
| U-200MX | 2700 |
| U-108AX | 1670 |

Set out below are illustrative examples of the compounds constituting the unsaturated alcohol ester of phenyl benzoate.

Ortho-, meta- and para-phenyl benzoates may all be used to this end, but preference is given to o- or p-phenyl benzoate.

The unsaturated alcohol used, for instance, may include vinyl, allyl, crotyl and propargyl alcohols.

The present organic glass obtained as mentioned above has a high refractive index and excels in various physical properties such as transmittance and impact resistance as well, as will be understood from the examples to be given later. Accordingly, this organic glass can be applied to optical parts to which only inorganic glass had been applied so far in the art.

EXAMPLES

In what follows, the present invention will be explained in greater detail with reference to the examples and comparative examples.

EXAMPLES 1-17 & COMPARATIVE EXAMPLES 1-6

Added to and well mixed with 100 parts of each of mixtures composed of the monomer components (a), (b) and (c) at the ratios shown in Table 1 were 4 parts of a polymerization initiator diisopropyl peroxydicarbonate (hereinafter IPP for short). The resulting composition was filled in a molding tool build up of an annular resin gasket 2 with glass molds 1 and 1 enclosed in it, as shown in FIG. 1. This molding tool was placed in a circulation type oven, in which it was heated at 40° C. for 5 hours, then at 40°–60° C. for 8 hours, then at 60°–70° C. for 2 hours, then at 70°–80° C. for one hour, and finally at 80° C. for 2 hours to bring polymerization to an end. After that, the resulting lens was removed from the molding tool and then subjected to a one-hour heat treatment at 110° C. As can be seen from Table 2 showing various physical properties of the resulting lenses, they have all high refractive indices and improved impact resistance, and excel in other physical properties as well.

Note that in Comparative Example 1 the diallyl ester of diphenic acid alone was molded under the same conditions as mentioned above, and in Comparative Example 2 ADC alone was molded under the same conditions as mentioned above, except the addition of 3 parts of the polymerization initiator.

EXAMPLE 1 OF APPLICATION

A silicon type hard coating solution was coated on the lens obtained in Example 7 by dipping, followed by a two-hour thermosetting at 100° C. The coat thickness was about 3 μm. This hard coated lens was found to have an adhesion of 100/100, a surface hardness of 4H and a resistance to scratching of A, and kept intact in terms of those properties, even after dyed at 92° C. for 30 minutes in a brown type disperse dye-containing dye bath, indicating that this lens can be well treated with a usual silicon type hard coating solution.

EXAMPLE 2 OF APPLICATION

After sufficiently cleaned, the lens obtained in Example 1 and hard coated as mentioned in Example 1 of Application was subjected to an antireflection coating treatment by vacuum deposition. The resultant lens was found to have a luminous transmittance of 98.5%, an adhesion of 100/100, a surface hardness of 7H and a resistance to scratching of 3A, providing a spectacles lens equivalent to a commercially available, so-called "HARD MULTICOAT" one.

COMPARATIVE EXAMPLE 7

Four parts of a polymerization initiator IPP were added to and well mixed with a mixture consisting of 80 parts of the diallyl ester of diphenic acid and 20 parts of diallyl isophthalate to form a homogeneous mixture, which was in turn filled in the above-mentioned molding tool. Polymerization was brought to an end by similar incremental heating as already mentioned, after which the molded piece was removed from the molding tool. However, no satisfactory lens was obtained, because the molded piece cracked during mold release. The polymer obtained by a one hour heat treatment at 110° C. had a sufficient refractive index of the order of 1.594 ($n_D$), but it was yellow in color, as expressed by $b^* = +3.22$ and could hardly be dyed, as expressed by a dyeability $T_L = 86\%$. In addition, it was very poor in resistance to scratching.

COMPARATIVE EXAMPLE 8

Four (4) parts of a polymerization initiator IPP were added to and well mixed with a mixture consisting of 80 parts of the diallyl ester of diphenic acid and 20 parts of ADC to form a homogeneous mixture, which was in turn filled in the above-mentioned molding tool. Polymerization was brought to an end by similar incremental heating as already mentioned, after which the molded piece was removed from the molding tool. However, no satisfactory lens was obtained, because the molded piece cracked during mold release. For all that, the polymer obtained by a one-hour heat treatment at 110° C. had a refractive index of 1.581 ($n_D$) and an yellowness $b^*$ of $+1.97$ and was well improved in terms of impact resistance. However, it was seriously poor in dyeability, as expressed by $T_L = 72\%$.

COMPARATIVE EXAMPLE 9

Four (4) parts of a polymerization initiator IPP were added to and well mixed with a mixture consisting of 80 parts of the diallyl ester of diphenic acid and 20 parts of a monofunctional urethane acrylate (NK OLIGO U-PMV-1 made by Shin-Nakamura Kagaku Kogyo K.K. and having a molecular weight of about 1200) to form a homogeneous mixture, which was in turn filled in the above-mentioned molding tool. Polymerization was brought to an end by similar incremental heating as already mentioned, after which the molded piece was removed from the molding tool, followed by a one-hour heat treatment at 110° C. Various properties of the obtained lens are shown in Table 2.

Note that the physical properties of samples were measured as follows.

(1) Refractive Index & Dispersion

To this end, a sample block with optically polished diagonal planes was used along with an Abbe's refractometer (made by Atago K.K.).

(2) Specific Gravity

By calculation, the specific gravity of a sample was found from the measurement of its buoyance in purified water of 20° C.

(3) Yellowness

The $L^*a^*b^*$ of a sample was measured with a color chromoscope ("CR-100 Model" made by Minolta Camera Co., Ltd.) and compared with a b value (bear in mind that $+b^*$ stands for yellow).

(4) Impact Resistance

According to U.S. FDA specifications, a steel ball of ⅝in. (ca. 15.9 mm) in diameter and 0.56 oz. (ca. 16.2 g) in weight was let fall spontaneously from a height of 50 in. (ca. 127 cm) onto ten samples. Then, to what degree they cracked or broken down was estimated on the following bases.

◯: Any samples did not crack
△: Less than a half of the samples cracked
x: Nearly all the samples cracked.

(5) Dyeability

The dyeability of a sample was determined by its luminous transmittance measured after it had been dyed in a brown type disperse dye-containing dye bath at 92° C. for 10 minutes. The smaller the value, the higher the degree of pigmentation.

(6) Luminous Transmittance

The luminous transmittance of a sample was measured with a luminous transmittance meter (made by Fuji Koden K.K.).

(7) Moldability

On the following bases, a lens sample was estimated in terms of in what state it was molded and in what state it was removed from a molding tool.

◯: Very excellent
△: No production problem arose.
x: Cracking took place at the time of mold release or having degraded appearance.

(8) Resistance to Scratching

A sample was rubbed 15 times in a reciprocating manner with #0000 steel wool under a load of 200 g to estimate it in terms of to what degree it was scratched on the following bases.

3A: No scratch was found at all.
2A: Scratches, if any, were substantially invisible.
A: Scratches, if detectable, were slight.
B: Within tolerance limits.
C: Scratches were visible.
D: Serious scratches were found.

(9) Adhesion

According to JIS D-0202, a peeling test using a cellophane adhesive tape was repeated twice with a sample with 100 squares provided on it with a knife, each of 1 $mm^2$ in size. Then, the adhesion of the sample was estimated by a mean number of the remaining sqaures (in %).

(10) Surface Hardness

Based on JIS K-5400, a sample was tested under a load of 1 Kg. Then, the surface hardness of the sample was estimated in terms of a maximum pencil hardness at which it did not flaw.

TABLE 1

| | Component | | |
|---|---|---|---|
| | (a) Diallyl Ester of Diphenic Acid | (b) Urethane Acrylate | (c) Allyl Phenyl Benzoate |
| Example | | | |
| 1 | 95 | 5 | — — |
| 2 | 90 | 10 | — — |
| 3 | 85 | 15 | — — |

TABLE 1-continued

| | Component | | |
|---|---|---|---|
| | (a) Diallyl Ester of Diphenic Acid | (b) Urethane Acrylate | (c) Allyl Phenyl Benzoate | |
| 4 | 80 | 15 | 5 | — |
| 5 | 80 | 15 | — | 5 |
| 6 | 80 | 10 | 10 | — |
| 7 | 70 | 10 | 20 | — |
| 8 | 70 | 10 | — | 20 |
| 9 | 60 | 20 | — | 20 |
| 10 | 60 | 15 | 25 | — |
| 11 | 50 | 20 | 30 | — |
| 12 | 50 | 20 | — | 30 |
| 13 | 50 | 15 | 35 | — |
| 14 | 50 | 15 | — | 35 |
| 15 | 70 | U108A: 10 | — | 20 |
| 16 | 90 | U200MX: 10 | — | — |
| 17 | 90 | U108AX: 10 | — | — |
| Comp. Example | | | | |
| 1 | 100 | — | — | — |
| 2 | 100 | ......... ADC | | |
| 3 | 80 | — | 20 | — |
| 4 | 80 | — | — | 20 |
| 5 | 80 | 20 | — | — |
| 6 | 30 | 20 | — | 50 |

What is claimed is:

1. An organic glass for optical parts, comprising as a main polymer component a bipolymer consisting of the polymerization product of the following monomer components (a) and (b):
   (a) 85–95 parts by weight of a diallyl ester of diphenic acid, and
   (b) 5–15 parts by weight of an urethane acrylate having vinyl groups introduced into both its ends by the reaction of a chainlike polyurethane having hydroxyl groups at both its ends with acrylic or methacrylic acid.

2. An organic glass for optical parts, comprising as a main polymer component a terpolymer consisting of the polymerization product of the following monomer components (a), (b) and (c):
   (a) 50–90 parts by weight of a diallyl ester of diphenic acid,
   (b) 5–20 parts by weight of an urethane acrylate having vinyl groups introduced into both its ends by the reaction of a chainlike polyurethane having hydroxyl groups at both its ends with acrylic or methacrylic acid, and
   (c) 5–35 parts by weight of an unsaturated alcohol ester of phenyl benzoate.

* * * * *

TABLE 2

| | Refractive Index ($n_D$) | Dispersion ($v$) | Specific Gravity (d) | Yellow-ness (b*) | Impact Resistance | | Dye-ability (%) | Luminous Transmittance (%) | Moldability | Resistance to Scratching |
|---|---|---|---|---|---|---|---|---|---|---|
| | | | | | 16.2 g | 28.2 g | | | | |
| Example | | | | | | | | | | |
| 1 | 1.597 | 29.3 | 1.24 | +1.43 | ○ | ○ | 45 | 91 | ◉ | A |
| 2 | 1.594 | 30.4 | 1.24 | +1.42 | ○ | ○ | 31 | " | ◉ | A |
| 3 | 1.590 | 31.1 | 1.23 | +1.22 | ○ | ○ | 18 | " | ◉ | B |
| 4 | 1.587 | 30.2 | 1.25 | +1.21 | ○ | ○ | 15 | " | ◉ | B |
| 5 | 1.589 | 31.9 | 1.24 | +1.35 | ○ | ○ | 13 | " | ◉ | B |
| 6 | 1.595 | 30.1 | 1.24 | +1.38 | ○ | ○ | 11 | " | ○ | A |
| 7 | 1.594 | 31.4 | 1.23 | +1.22 | ○ | ○ | 8 | " | ○ | A |
| 8 | 1.599 | 28.3 | 1.23 | +1.47 | ○ | ○ | 6 | " | ○ | A |
| 9 | 1.590 | 28.0 | 1.24 | +1.31 | ○ | ○ | 3 | " | ○ | B |
| 10 | 1.591 | 31.4 | 1.24 | +1.51 | ○ | ○ | 6 | " | ○ | B |
| 11 | 1.591 | 29.3 | 1.23 | +1.78 | ○ | ○ | 3 | " | ○ | B |
| 12 | 1.593 | 29.0 | 1.23 | +1.74 | ○ | ○ | 4 | " | ○ | B |
| 13 | 1.592 | 30.7 | 1.24 | +1.75 | ○ | △ | 5 | " | ○ | B |
| 14 | 1.601 | 28.5 | 1.23 | +1.97 | ○ | △ | 3 | " | ○ | B |
| 15 | 1.599 | 29.1 | 1.23 | +1.59 | ○ | ○ | 10 | " | ◉ | A |
| 16 | 1.591 | 30.0 | 1.24 | +1.51 | ○ | ○ | 35 | " | ◉ | A |
| 17 | 1.592 | 31.0 | 1.24 | +1.80 | ○ | ○ | 32 | " | ◉ | A |
| Comp. Example | | | | | | | | | | |
| 1 | 1.603 | 29.9 | 1.23 | +3.98 | X | X | 83 | 90 | X | A |
| 2 | 1.498 | 59.3 | 1.31 | +0.43 | ○ | ○ | 24 | 92 | ◉ | 2A |
| 3 | 1.604 | 29.9 | 1.23 | +1.04 | X | X | 8 | 91 | X | A |
| 4 | 1.607 | 27.0 | 1.23 | +1.51 | X | X | 7 | 90 | X | A |
| 5 | 1.585 | 35.3 | 1.24 | +2.41 | ○ | ○ | 9 | 90 | X | A |
| 6 | 1.600 | 28.2 | 1.24 | +1.70 | X | X | 3 | 91 | X | C |
| 9 | 1.577 | 32.6 | 1.22 | +5.43 | ○ | ○ | 15 | 89 | ◉ | — |

UNITED STATES PATENT AND TRADEMARK OFFICE
CERTIFICATE OF CORRECTION

PATENT NO.: 5,278,268
DATED : January 11, 1994
INVENTOR(S): TORII et al.

It is certified that error appears in the above-identified patent and that said Letters Patent is hereby corrected as shown below:

Column 2, line 41, change "With" to --with--.

Column 3, line 33, change "Its" to --its--.

Column 6, line 9, before ":" insert -- O --;

line 10, before ":" insert --Δ--;

line 29, before ":" insert -- ◎ --;

line 30, before ":" insert -- O --.

Signed and Sealed this

Eighteenth Day of October, 1994

Attest:

BRUCE LEHMAN

Attesting Officer     *Commissioner of Patents and Trademarks*